May 29, 1928. 1,671,583
J. B. HENDERSON
GYRO NAVIGATIONAL APPARATUS
Filed July 21, 1922   3 Sheets-Sheet 2

Inventor
James Blacklock Henderson

May 29, 1928.

J. B. HENDERSON 1,671,583

GYRO NAVIGATIONAL APPARATUS

Filed July 21, 1922      3 Sheets-Sheet 3

Inventor
James Blacklock Henderson

Patented May 29, 1928.

1,671,583

UNITED STATES PATENT OFFICE.

JAMES BLACKLOCK HENDERSON, OF BLACKHEATH, ENGLAND.

GYRO NAVIGATIONAL APPARATUS.

Application filed July 21, 1922, Serial No. 576,480, and in Great Britain August 8, 1921.

My invention consists of improvements in gyro navigational apparatus by means of which the deviations of the gyroscope which are produced by dynamical impulses are eliminated. In my co-pending application No. 313,537, filed July 26, 1919, I have shown how I eliminate the deviation due to rolling of the ship on an intercardinal course by providing a gravitational control system, such as a liquid level device, which is virtually in neutral equilibrium as regards the action of periodic accelerations, but which becomes effective upon deviation of the gyroscope from its normal position to apply a gravity control couple approximately proportional to the deviation from such position. Two other deviations due to dynamical causes are;—(1) the deviation produced by acceleration of the ship due either to change of speed or change of course, and (2) the deviation due to swinging of the compass in the binnacle. The object of my present invention is the elimination of these two deviations so that the gyroscope will always maintain the same bearing relatively to the earth, no matter how the ship or aircraft carrying it changes course or speed or is buffeted about by wind or waves.

My invention comprises a gyroscopic navigational instrument in which the gravity control of the gyroscope is produced by the flow of a viscous fluid in a level, as described in my co-pending application No. 313,537. By employing a fluid of sufficient viscosity I eliminate the ballistic deflection in azimuth which has been common in gyro-compasses up to date above referred to. A change of speed parallel to the level produces a displacement of fluid in the level proportionate to the change of speed, and this displacement would subsequently produce a deviation of the gyroscope but for the adjustments which I introduce. I adjust the zero of the level by moving its point of attachment by an amount proportional to the change of velocity so that the displacement of fluid is maintained after the acceleration ceases and I apply compensating torques proportional to the change of velocity so that the net resultant change in the torques applied to the gyroscope by the displacement of fluid and the adjustments is just sufficient to produce a precessional velocity equal to the angular velocity round the earth represented by the change of velocity of the ship, so that the gyroscope may retain a constant bearing relatively to the earth.

I also eliminate the deviation due to swinging of the gyroscope in the binnacle by designing the gimbal supports of the gyroscope so that there is dynamical symmetry when swinging in any plane. This I effect by mounting the gyroscope trunnions on a horizontal gimbal ring which is fixed to a vertical gimbal ring in the plane of the rotor axis, thereby obviating the necessity for compensating weights.

My present invention therefore consists in gyroscopic navigational apparatus in which the gyroscope maintains a permanent position relatively to the earth independent of (1) rolling, pitching or yawing of the ship or platform on which it may be mounted, (2) acceleration of the ship or platform, and (3) pendular oscillation of the gyroscope in its binnacle.

In my co-pending application No. 427,424, filed Nov. 30, 1920, I have described improvements in gyroscopic navigational apparatus which have the object of causing the gyroscope and its gravitational control system to move from one steady state to another during the acceleration of the ship, and that invention was described and illustrated more particularly in its application to my aperiodic gyro-compass. My present invention therefore includes a particular case of the above, in which the gyroscope has no ballistic deflection due to change of course or speed.

In the attached drawings Fig. 1 is an elevation, part sectioned, of the south end of a gyro-compass.

Figs. 1ª and 1ᵇ illustrate two details of Fig. 1.

Figure 1:
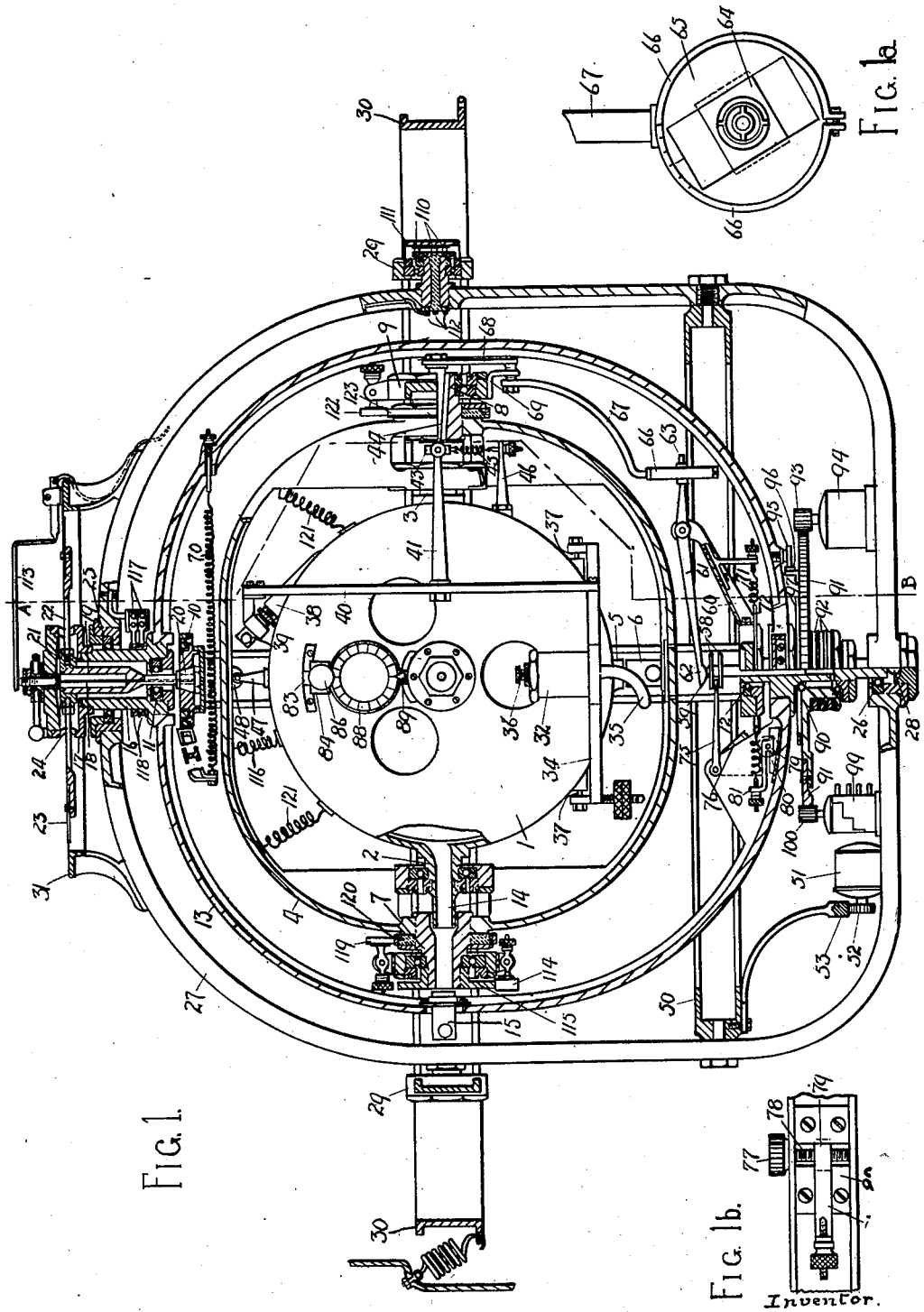

The gyroscope in its casing 1 is supported in horizontal trunnions 2—3 in ball bearings carried on projections inside a ring 4 which is kept in phase with the gyro case by an air jet emerging from a nozzle 5 on the gyro casing 1, the air being deflected by a chute 6 carried by the ring 4, of a type described in my co-pending application No.

320,681, filed Aug. 29, 1919, in such a manner that the ring 4 is compelled to follow the gyro casing in any movement about the axis 2—3. As shown in that application the chute consists of a hollow cylindrical box having a closed bottom and divided vertically by a diaphragm. The box has two diametrically opposite apertures at its closed end. The diaphragm is helical in form and twists through 180° in the length of the box so that the air entering the near side of the diaphragm leaves the box through the hole which is on the far side of the diaphragm and vice versa, so that the air-jet emerging from the nozzle tends to keep the box coaxial with the jet.

The ring 4 is supported on horizontal trunnions 7 and 8 collinear with the trunnions 2—3, in a horizontal ring 9 which is bolted on its N—S diameter to a vertical ring 10, which in turn is pivoted on ball-bearing trunnions 11 and 12 in a vertical ring 13 which lies in the E—W plane of the gyro and is made to follow the latter in azimuth by an air jet issuing from a nozzle 14 attached to the hollow trunnion 2 and thence passing through the hollow trunnion 7, on the outside of which the air is intercepted by a chute 15, similar in construction to the chute 6, carried by the ring 13.

The ring 13 supports at its top a tubular extension 16 which carries at its upper end a cylindrical member 17 from which the sensitive element, i. e. the ring 10 and everything within it, is suspended by a filar suspension and torsion head in the usual manner. The lower end of the filar 18 is attached to the bottom of a tube 19 which is screwed into a cone 20 seated in the ring 10, the thin lower end of the tube 19 forming the upper trunnion of the ring 10. The upper end of the tube 19 carries a ring 21 into which arms 22 which support the compass card 23 are screwed through holes 24 in the cylinder 17. The compass card is thus carried by the sensitive element.

The ring 13 is supported on ball-bearing trunnions 25 and 26 in a vertical gimbal ring 27, the weight of the whole sensitive and following elements being taken by a single thrust ball 28 in the bottom bearing of the ring 27.

The ring 27 is suspended in the usual system of outer gimbal rings 29 and 30, the outermost ring 30 being suspended on springs from a binnacle or frame attached to the aeroplane or ship. On board ship the outer gimbal rings may be of the usual close-fitting type but for use on aeroplanes capable of very considerable angular movement in three dimensions I make the rings 29 and 30, as illustrated, sufficiently wide to permit of the rings 27 and 29 with everything contained therein being turned on their trunnion axes through 360 degrees without fouling each other or the ring 30. The gyroscope 1 and ring 4 are by the nature of their suspension capable of turning somersaults within the ring 10 without fouling, but this provides protection only about the axis 2—3. With outer gimbal rings as described however, the compass is protected in the event of the aeroplane, say, rolling over sideways about an axis parallel with the rotor axis, in which case the scope of movement of the gyroscope about the axis 2—3 would afford the compass no protection.

The ring 27 supports at its top a lubber ring 31 provided with the usual lubber line for reading the compass.

The gravitational control of the compass is effected by a level of the type described in my co-pending application No. 313,537, referred to above, consisting of two vertical cups 32 and 33 connected to each other by a ring 34 and by a communicating tube 35, by which the contained fluid may pass from one cup to the other. The orifice between each cup and the tube 35 has a screw-down valve 36 adjustable from outside, by means of which the rate of flow of fluid can be regulated or stopped, or adjustment made for varying viscosity of fluid.

The level is pivoted on the gyro case on two ball-bearing pivots 37 and is constrained relatively to the gyro case by an air jet issuing from a nozzle 38 on the latter and intercepted by a chute 39, similar to the chute 6, carried by a ring 40 attached to both sides of the level. On a level with the trunnion axis 2—3 the ring 40 carries on either side of the gyro a pin 41, both of which are attached by springs 42 to a small ring 43 pivoted on a pin 44 which is capable of a small horizontal adjustment in a N—S direction within the hollow trunnion 8. The ring 43 is also connected by a spring 45 to a pin 46 on the gyro case vertically below the axis 2—3 when the rotor axis is horizontal.

The entire level is balanced in neutral equilibrium on the pivots 37 with the contained fluid equally distributed between the two cups and flow prevented, and the gyroscope and level together are similarly balanced on the trunnion axis 2—3.

The function of the chutes 6, 15 and 39 is not only to make the rings 4 and 13 and the level follow all apparent movements of the gyroscope, but also to keep these members in a constant state of small oscillation, by which means friction in the trunnion bearings 2—3, 7—8, 11—12, 25—26 and 37 is eliminated as far as possible. To prevent the ring 4 being accidentally turned through an angle sufficient to take the chute 6 beyond the jet of air issuing from the nozzle 5 a stop 47 is fitted to the top of the gyro case 1 between two projections 48 on the ring 4, with sufficient clearance to permit the ring 4 to perform its required oscillatory movements without bringing the stop against the projections, but not sufficiently wide to allow the chute 6 to pass out of the air jet from the nozzle 5. In the case of the ring 13, to prevent the ring being accidentally thrown out of phase with the gyro and to prevent damage to the arms 22 and displacement of the pin 44, stops are also provided by a member which will be described later.

Figure 2:
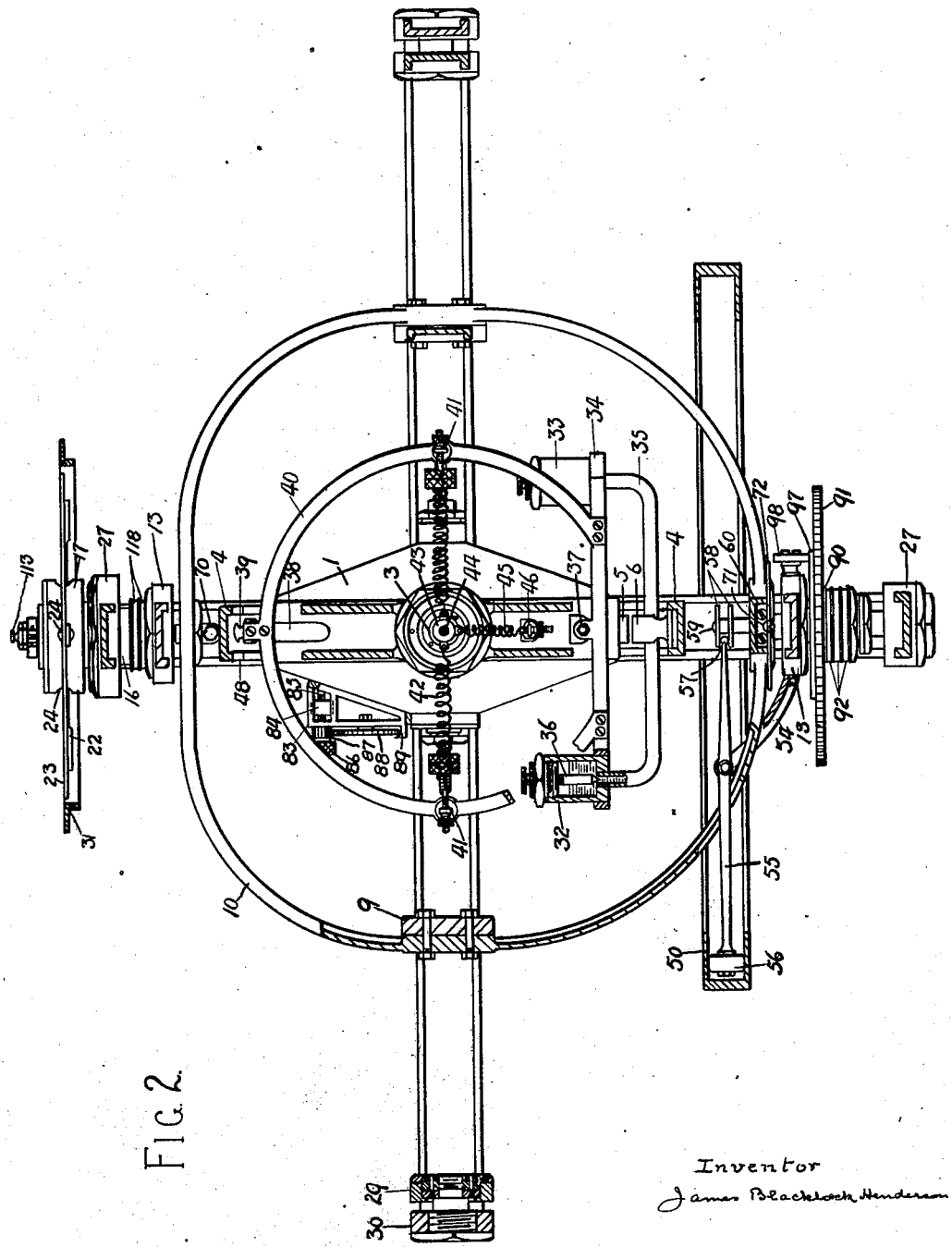
Fig. 2 is an end elevation, part sectioned, of Fig. 1 sectioned on the line A—B.

Pivoted to the two sides of the ring 27 is a horizontal channel ring 50 which is capable of being tilted on its pivots through a certain range of movement either by manual or automatic means. As illustrated I show it actuated by a small step-by-step motor 51 carried on the ring 27, the pinion 52 of which meshes with a toothed sector 53 on an arm bolted to the ring 50. A bracket 54 (Fig. 2) bolted to the ring 13 on the South side with an arm on either side of the ring 10 supports a lever 55 one end of which passes through a hole in the ring 10 and has an axial roller 56, which is part of a sphere, engaging in the channel of the ring 50. The other end of the lever 55 is a ball 57 engaging in a collar 58 on the upper end of a pin 59 housed in the hollow lower trunnion of the ring 13. The two arms of the bracket 54 are clear of the sides of the ring 10 but co-operate therewith to act as stops to keep the ring 13 in phase with the gyro in event of any accidental disturbance, as mentioned in the preceding paragraph.

I tilt the ring 50 through an angle proportional to the speed of the craft either by hand or by actuating the motor 51 from the ship's log and, the ring 50 being fixed relatively to the ship while the lever 55 is fixed to the ring 13 and therefore fixed in azimuth and the pivots of the ring 50 are on a level with the pivots of the lever 55, it follows that the lever 55 will be tilted and the pin 59 raised or lowered from a central zero position by an amount proportional to the speed and heading of the craft. In other words the vertical displacement of the pin 59 is proportional to the speed along the meridian or to the rate of change of latitude.

Bolted to the bottom of the sensitive ring 10 (Fig. 1) is a bracket 60 in the E—W plane which supports a pivoted lever 61, the inner end of which has a curved head 62 resting on the round head of the pin 59. The pivot axis of the lever 61 is level with the tip of the pin 59 in its highest position and the head 62 is cut in a volute curve so that its contact with the pin 59 will always be on the vertical axis of the sensitive system and the torque about that axis due to friction at the point of contact will be negligible.

The tail of the lever 61 consists of a pin 63 engaging in a tubular socket carried in a universal joint by a plate 64 (Fig. 1ª) which is free to slide in a slot in a circular plate 65 held in the circular split grip 66 attached to a curved arm 67 keyed to a crank 68 (Fig. 1) which is pivoted in a bracket 69 bolted to the east trunnion of the sensitive ring 9. The crank 68 carries the pin 44 described above.

As the maximum speed of an aeroplane is much greater than that of a ship and it is advisable in either case to utilize the full range of movement of the ring 50 and pin 59, I engrave a line on the plate 65 and a scale on the circular grip 66 representing a range of speeds, so that the inclination of the slide 64 can be set suitably for the maximum speed of the craft on which the compass is installed.

The vertical displacement of the pin 59 produced by the cam 50 causes a proportional vertical movement of the pin 63 and plate 64 in its inclined slots and thereby a proportional horizontal movement of the plate 65 and arm 67 in a vertical N—S plane, accompanied by a proportionate and reverse movement of the crank 68 and pin 44 to which the springs 42 on the level are attached. That is to say, the point of spring attachment of the level to the sensitive element is horizontally displaced in a N—S direction by an amount proportional to the rate of change of latitude, the adjustment being effected without introducing any external torques on the sensitive element other than the gravitational torques on the level and the torque on the gyro due to the spring 45.

To reduce torsional stiffness in the suspension of the gyroscope I fit two springs 70 and 71 in the E—W plane from one side of the ring 13 to the other side of the ringe 10. The attachments of the spring 70 are fixed, but the lower spring 71, which has interposed at its centre a light ring 72 encircling the trunnion 12, has its point of attachment to the ring 13 adjustable to introduce automatically a torque about the vertical axis proportional to the rate of change of latitude, for a purpose which I shall describe later. To effect this I pivot on the ring 13 level with the centre point of travel of the pin 59 a lever 75 with a ball end engaging in the collar 58 of the pin 59. Cranked to the lever 75 outside the ring 13 is a toothed sector 76 meshing with a pinion 77 (Fig. 1ᵇ) on the end of a screw 78 which traverses a nut 79 in guides in a plate 80 bolted to, but insulated from, the ring 13. The nut 79 carries an arm 81 to which the spring 71 is attached. When the pin 59 is in its central or zero position the nut 79 and spring 71 are in the central vertical plane of the ring 13 and the spring 71 assists the spring 70 to overcome the torsional stiffness of the suspension, but any displacement of the pin 59 up or down will cause the lever 75 and sector 76 to rotate the pinion 77 and screw 78, thus displacing the nut 79 laterally on the ring 13 and throwing the point of attachment of the spring 71 off the dead centre by an amount proportional to the displacement of the pin 59, and introducing a torque about the vertical axis of the sensitive element proportional thereto, that is, proportional to the rate of change of latitude, the proportion being governed by the spring force, the gear ratio 76—77 and the pitch of the screw 78.

Figure 3:
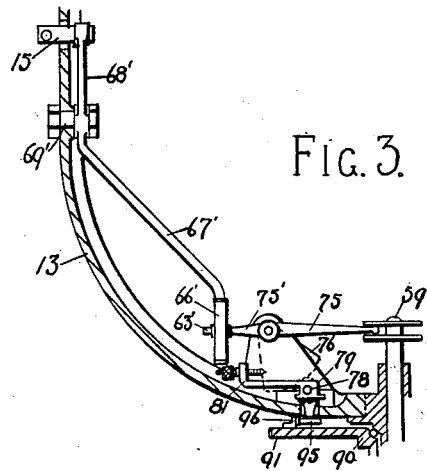
Fig. 3 shows an alternative method of producing torques about the vertical axis.

Alternatively I may produce this torque about the vertical axis by twisting the suspension filar 18, say by deflecting the following ring 13 relatively to the sensitive element. Fig. 3 shows the mechanism I may employ for this purpose. The chute 15 instead of being rigidly attached to the ring 13 is carried by a system of levers and links similar to 66, 67, 68 and numbered respectively 66', 67', 68' &c., the crank bracket 69 being replaced by a pin 69' carried by the ring 13. The lever 75 is made a double lever 75' and operates like the lever 61—63 so that as the pin 59 is moved up or down the chute 15 is moved across the ring 13, and as the chute will be kept in phase with the gyro by the air jet the result will be a displacement of the ring 13 relatively to the sensitive element, thereby imparting a torque to the latter by twisting the filar 18. I may in some cases then omit the cross springs 70 and 71, but as they serve as a convenient means of introducing the electrical currents to the gyro I may retain them, allowing for their counter-torque in arranging the amount of displacement I give to the chute 15. By combining the above mechanism with the torque mechanism illustrated in Fig. 1 (Fig. 3 shows them in combination) I can easily arrange that the nut 79 and spring 71 will receive the same displacement as the chute 15 so that the spring 71 will retain a constant position relatively to the sensitive element and will serve constantly to overcome the torsional stiffness of the filar suspension.

To keep the gyro rotor axis normally horizontal at all latitudes I apply a torque about the horizontal trunnion axis to produce a precessional velocity equal to ω sin λ, the component angular velocity of the earth round the vertical. I effect this by means of a moving weight 84 carried by the gyro case 1 in a frame 83 bolted to the face of the gyro case, the weight 84 being in the form of a nut moved in guides in the frame 83 parallel to the rotor axis by a screw 85 to which are rigidly attached, outside the frame 83, a milled head 86 and a small toothed pinion 87 meshing with a toothed wheel 88 pivoted on the frame 83. The outer face of the wheel 88 is graduated on both sides of a zero mark in tens of degrees of latitude North and South, reading against a fixed pointer 89 on the frame 83. When the weight 84 is in the centre of its guides the zero graduation of the scale is against the pointer 89 and in this position the gyro and level are balanced in neutral equilibrium on the trunnion axis 2—3. The weight of the mass 84 and the pitch of the screw 85 are suitably selected to produce the correct compensating torque about the horizontal axis when the milled head 86 is rotated by hand until the graduation on the wheel 88 representing the latitude is brought against the pointer 89.

For purposes of transmitting to a distance indications of apparent movements in azimuth of the gyroscope, I fit a power-driven follower of usual type which is quite independent of the compass proper, and any breakdown of which does not interfere with the correct functioning of the latter. Pivoted on ball bearings on the lower trunnion of the ring 13 or on a concentric sleeve carried by the ring 27 is a tubular follower 90 carrying a horizontal toothed ring 91 and provided with three slip rings 92. Meshing with the ring 91 is the pinion 93 of a small follow-up motor 94 actuated by contact between a trolley 95 carried by the ring 13 and a two-piece commutator 96 mounted on the ring 91, the two segments of the commutator being wired to two of the slip rings 92. The third slip ring is connected to an insulated ring 97 on the follower, whence the current is picked up by a trolley 98 (Fig. 2) fixed to the ring 13, and passes to the trolley 95 through the ring 13 on which both trolleys are electrically connected. The ring 27 also carries a transmitter 99, the pinion 100 of which meshes with the ring 91. The brushes of the transmitter 99 I connect by the usual wiring to a system of repeater dials where required.

For purposes of very close following I may mount the trolley 95 on the sensitive ring 10 instead of on the air-blown following ring 13, but to relieve the sensitive element of the torque about the vertical axis due to friction at the contacts 95—96, I prefer the method illustrated and regulate the jet 14 and chute 15 so that the oscillations of the ring 13 are reduced to a mere tremor of a small fraction of a degree of arc.

Where I use the torque mechanism illustrated in Fig. 3 the displacement of the ring 13 would lead to an error in all the repeating compasses if the trolley 95 were mounted as shown in Fig. 1 and described above. To obviate this error I may mount the trolley 95 on the nut 79 through a hole in the ring 13 and in the base-plate 80, as illustrated in Fig. 3. As already explained in the description of that figure the mechanism is so arranged that the nut 79 therein does not participate in the displacement of the ring 13 and the trolley 95, if so mounted, will remain in correct phase with the sensitive element and no error will be communicated to the follower 90 and the repeater dials.

Figure 4:
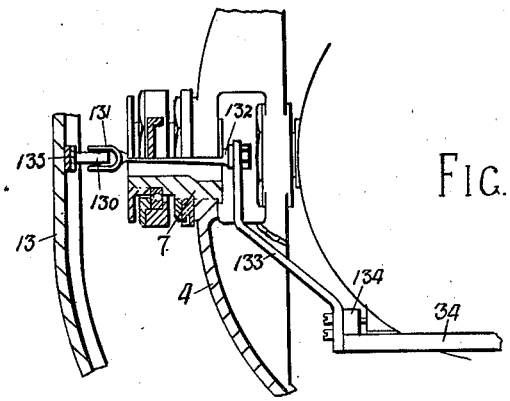
Fig. 4 illustrates another alternative torque mechanism particularly applicable to aircraft compasses.

The above design of compass, if fitted to aircraft, would suffer in accuracy from the variation of the jet issuing from the nozzle 38 which partly controls the level, as the asmospheric pressure changes with the altitude. In compasses for aircraft made according to my invention, instead of trying to keep the air pressure in the binnacle constant, I prefer to discard the air-jet damping and apply torques about the vertical by twisting the suspension as described in my co-pending application No. 336,626, filed November 8, 1919, in which the precessional motion of the rotor axis is damped by twisting the wire suspension of the gyroscope through an angle proportional to the elevation of the rotor axis above or its depression below the standard zero position on the meridian. In the present case I omit the nozzles 14 and 38 and fix the toothed ring 91 to the following ring 13, controlling the motor 94 by a contact roller fixed to the level as shown in Fig. 4, in which the trolley roller 130 is carried in a fork 131 attached to a stem 132 which passes through the hollow trunnion 7. This stem is carried by the bracket 133 fixed to the lug 134 of the level. The two-part commutator 135 is fixed to the ring 13. It is evident that when the gyro tilts from the horizontal the level tilts further than the gyro and the stem 132 and roller 130 will deviate from the centre of the trunnion 7 by an amount proportional to the tilt of the level. The ring 13 will follow this deviation and will impart a twist to the suspension filar 18 which will produce a torque about the vertical in the same sense as the torque produced by the air jet issuing from the nozzle 38 in Fig. 1. The value of the torque can be adjusted by varying the relative stiffness of the suspension filament 18 and the tension of the springs 70 and 71. The torque mechanism shown in Fig. 3 can be combined with the damping mechanism illustrated in Fig. 4 by removing the chute 15 in Fig. 3 and substituting therefor on the crank 68' the two-part commutator 135 of Fig. 4.

The gyro rotor is driven by a three-phase alternating current motor, the three phases of which are brought in by flexible leads through the hollow trunnions of the outer gimbal system to one of the trunnions of the ring 27 where they are connected to three brushes 110 attached to a bridge 111 carried by the ring 29. These brushes are in constant contact with a central pole and two circular concentric rings carried on a plug of insulating material screwed into the hollow trunnion of the ring 27, the pole and rings being wired through the insulation to three terminals 112 on the inside of the ring 27. Thence the first phase is conveyed by wiring round the ring 27 to a spring brush 113 bearing on the top of the torsion head, which is insulated, thence through the suspension filar 18 to the ring 10, thence by wiring round the ring 10 and horizontal ring 9 to the trolley 114 on the trunnion 7 which is in contact with a disc 115 screwed on to the hollow trunnion 7. There the current is grounded and conveyed through the trunnion 7 and ring 4 to the spiral lead 116 which is connected to a terminal on the gyro casing 1. The second phase is conveyed from one of the terminals 112 via the ring 27 to one of the two brushes 117 in contact with two slip rings 118 on the stem 16 of the ring 13, thence via the ring 13 and insulated spring 70 to the ring 10, thence via the rings 10 and 9 to a second trolley 119 on the trunnion 7 in contact with an insulated ring 120 on the ring 4, thence by wiring via the ring 4 and one of the spiral leads to a terminal on the gyro case 1. The third phase follows a course similar to that of the second, but passing from the ring 13 to the ring 10 via the insulated spring 71, and from the ring 9 to the ring 4 by a trolley 122 and insulated ring 123 on the trunnion 8.

It should be remarked that the necessity for the brushes 110, like the wide gimbal rings, only arises in case of aircraft capable of performing such evolutions as looping the loop. For ships and airships the requisite wiring is simply brought in to the terminals 112 by flexible leads and the rest of the wiring is also simplified by replacing the trolleys by flexible leads wherever possible.

The principles underlying my invention are applicable to many classes of gyroscopic apparatus, but for purposes of simplicity I have shown their application only to a gyro compass. In their following explanation of their function I again confine myself to the gyro-compass, but it is to be understood that similar functional descriptions could be given of the invention applied to other apparatus.

The functioning of a gyro-compass constructed according to my invention as described above is as follows:—

The gyroscope 1 when set up with its rotor axis horizontal, the level horizontal and the weight 84 set to zero latitude, is in neutral equilibrium. The gyro rotor revolves in the opposite sense to the earth. Assume that the rotor axis is to the East of North and the weight 84 set to the correct latitude, then the component rotation of the earth $\omega \cos \lambda$ about the N—S horizontal line gradually causes the North end of the rotor axis to acquire a tilt upwards causing a flow of fluid in the level towards the South end, i. e. from cup 33 to cup 32. The level therefore tilts relatively to the gyroscope until the air force on the chute 39 and the spring force on the pins 41 are together sufficient to hold up the level. The air force on the chute 39 and the spring force on the pins 41 are both transmitted to the gyroscope through the pivots 37 producing a torque about the horizontal trunnions 2—3, while the air force on the chute 39 also produces a torque about the vertical trunnion axis because of the eccentricity of the chute. The spring force on the pins 41 produces a torque about the vertical which is balanced by the reaction torque on the pin 44 transmitted to the gyro 1 through the ring 9, trunnions 7—8, ring 4 and trunnions 2—3. The torque about the horizontal trunnion axis introduces a precession towards the meridian and the torque about the vertical axis, due to the chute 39, a precession towards the horizontal, the combination causing the gyroscope to come gradually to the meridian in the usual spiral path if the control is adjusted for a periodic motion. The viscosity of the fluid in the level allows only a very small flow to take place on periodic oscillation of the ship of from 10 to 20 seconds period due to waves, and the compass is therefore free from the disturbance common in gyro-compasses fitted with pendular control when the ship is rolling or pitching on an intercardinal course.

The object of my present invention is to free the compass from the deviations due to (1) acceleration of the ship and (2) oscillation of the compass in the binnacle. With regard to the former, when any acceleration takes place in the E—W direction the compass bearing is not affected in any way because no flow takes place in the level as a result of the acceleration. When acceleration occurs in a N—S direction, however, the fluid in the level flows in the opposite direction to the acceleration and I arrange the viscosity of the fluid to be sufficiently great that the quantity of fluid displaced is simply proportional to the change of velocity in the N—S direction. This displacement of fluid produces torques on the gyroscope which, if left uncompensated, would cause the gyroscope to stray from the meridian, and in addition, when the acceleration ceased, the fluid would start to flow back again. I prevent the return flow by adjusting the pin 44, which is the anchorage of the two springs 42 of the level, through a small displacement proportional to the change of velocity in the N—S direction, thus allowing the level to tilt further over until the surface levels in the cups 32 and 33 are in the same horizontal plane. This adjustment, if carried out continuously during the acceleration, keeps the surface level in the cups 32 and 33 continuously in the same horizontal plane and causes the displacement of fluid due to the acceleration to be accurately proportional to the change of velocity parallel with the level. This same adjustment reduces the force transmitted to the pivots 37 from the springs 42 through the pins 41 and thus reduces the torque about the horizontal axis 2—3. It also produces a countertorque on the gyroscope about this horizontal axis from the spring 45 which no longer passes through the axis 2/3. I arrange the constants of the level, the springs and the air jet so that the net torque about the horizontal axis created by the acceleration and the adjustment of the pin 44 is zero. The adjustment is made automatically by the motor 51, which is actuated by the ship's log, tilting the cam ring 50 to an inclination proportional to the ship's speed. The pivots of the ring 50 are athwartships and therefore the roller 56, engaging with the cam and turning in azimuth with the compass, rises or falls by an amount proportional to the component speed along the meridian. The roller 56 tilts the lever 55, raising or lowering the pin 59, which actuates the pin 44 through the intermediate links 63, 61, 66, 67, 68 as already described.

The pin 59 also displaces the spring 71 laterally through the elements 75, 76, 77, 78, 79, 81 as already described, thus introducing a torque about the vertical axis. The air reaction on the chute 39 due to the tilt of the level also produces a torque about the vertical axis and I arrange these torques so that the resultant is just sufficient to produce a precession of the gyroscope equal to the new rate of change of latitude introduced by the N—S velocity. These adjustments, if carried out according to my invention, are sufficient to maintain the gyroscope in a constant bearing relatively to the earth, both during and after any acceleration of the ship or platform on which it is mounted.

The adjustments depend only upon the speed of the ship round the earth and not upon the latitude, other than the adjustment of the movable weight 84. Latitude, however, has an effect upon the period of oscillation of the compass, if periodic, and upon the damping coefficient. I could keep the period constant by adding an adjustment for latitude, adjusting the springs of the level or of the arm at which these springs act. I find, however, that this is unnecessary as variation of the period is immaterial provided that the accompanying variation of the damping coefficient does not produce an excessive diminution in the latter at any latitude.

If I denote the deviation from the meridian by $\theta = \theta_0 + Ae^{pt}$ in which $\theta_0$ is the final position of rest, A is a constant determined by the initial conditions of the elements of the apparatus and $p$ is the damping coefficient, then the equation for $p$ is a cubic, and if the motion is periodic may be written as $(p+a)(p^2+2pb+b^2+c^2)=0$, in which a and $b$ are the damping coefficients of the aperiodic and periodic motions respectively and $\frac{2\pi}{c}$ is the period. The term $a(b^2+c^2)$ contains the cosine of the latitude, so that $a$, $b$ and $c$ all vary with the latitude.

The simplest arrangement of carrying out my invention would be with no lateral adjustment of the spring 71 and with no spring 45 or with no tension on either. The equation of motion of the compass shows that the product of the viscous constant of the level and the damping torque constant about the vertical is fixed, that is to say $(b^2+c^2+2ab)$ is fixed. One equation is therefore known connecting $a$, $b$ and $c$, and if all three are equal, all are fixed.

If I make $a=b=c$ at the equator, then at latitude 60° $a$ is reduced to one third, $b$ is increased by 34% and $c$ is increased by 35%, whereas if I make $a=b=c$ at 60° latitude, then at the equator $a$ is doubled, $b$ is halved and $c$ is increased by 31%. When $a=b=c$ the fixed value of the above term fixes all three, and this value is as great as the damping coefficient commonly used in present day compasses. When, however, that value is halved by change of latitude the reduced damping coefficient becomes too small for practice. I have therefore introduced the extra adjustment torque about the vertical by moving the spring 71 or by the other torque mechanisms illustrated in order to reduce the variation of the damping coefficient with change of latitude. With this adjustment in use greater gravity control can be used and the variations of the damping coefficient are greatly reduced.

I have already mentioned the objection to using air jet control on the level for compasses for use on aircraft because of the variation of the control due to altitude. In such compasses I close the nozzle 38 and tighten the spring 45 so that when the adjustment of the spring 44 is made to prevent the return flow of fluid in the level, the torque on the gyro about the axis 2—3 will be zero.

In order to prevent the compass from deviating on account of short period oscillations in the binnacle I have arranged for dynamical similarity of the sensitive element in all planes through the vertical trunnions. To satisfy this requirement the moments of inertia about any horizontal axis through the centre of gravity of the sensitive element of all parts of the sensitive element which take part in any oscillation about that axis must be equal. Thus about the rotor axis the parts which can oscillate are the ring 9, ring 10, ring 4 and the gyro case 1. About the axis 2—3 they are the rings 9 and 10. About both axes the ring 9 oscillates about a diameter and hence, if uniform in section, affects both oscillations equally. The ring 10 oscillates in one case about a diameter and about a polar axis in the other, and if of uniform section, the moment of inertia about the polar axis is approximately double that about a diameter. The ring 4 and gyro case oscillate only about the rotor axis. Hence by difference the moment of inertia of the ring 10 about a diameter must be approximately equal to the moment of inertia of the ring 4 and the gyro case together about the rotor axis.

I claim:—

1. In gyroscopic navigational apparatus the combination of a gyroscope supported for movement about horizontal and vertical axes, a gravity control device for applying directive and damping torques to the gyroscope, means connected to the device for adjusting the position of said device relatively to the gyroscope in proportion to the effects on the device of the meridional component of an acceleration of the craft and means to apply to the gyroscope torques about a vertical and a horizontal axis in proportion to the meridional component of the speed of the craft.

2. In gyroscopic navigational apparatus the combination of a gyroscope and means for supporting the gyroscope for movement about a pair of mutually perpendicular axes at right angles to the spinning axis, said means comprising a casing within which the gyroscope is mounted and a gimbal frame supporting said casing comprising two concentric rings at right angles to each other having a common diameter substantially coincident with said spinning axis, said rings being rigidly connected together at the ends of said common diameter.

3. In gyroscopic navigational apparatus the combination of a gyroscope and means for supporting the gyroscope for movement about a pair of mutually perpendicular axes at right angles to the spinning axis of the gyroscope, said means comprising a casing within which the gyroscope is mounted on its spinning axis and a gimbal system supporting said casing on trunnions disposed at right angles to said spinning axis and consisting of a plurality of concentric intersecting rings, two of said rings being rigidly connected together at the extremities of a common diameter inclined to said trunnion axis.

4. In gyroscopic navigational apparatus the combination of a support, an element suspended from said support with freedom to swing in all vertical planes, a gyroscope having its spinning axis normally horizontal, a casing to support said gyroscope by its spinning axis and means to mount said casing in said element with freedom to move about two mutually perpendicular axes at right angles to said spinning axis and to prevent deviation of said axis due to swinging of said element, said means comprising a gimbal frame supporting said casing on horizontal trunnions at right angles to said spinning axis and supported by said element on normally vertical trunnions and consisting of a member encircling the gyro casing in the vertical plane of said spinning axis and having its mass so disposed that its moment of inertia about said horizontal trunnion axis is substantially equal to the combined moments of inertia of itself and said casing about the spinning axis, and a second member rigidly attached to said first member and supporting said horizontal trunnion axis and having its mass so distributed that it has equal moments about both said axes.

5. In gyroscopic navigational apparatus, the combination of a gyroscope, a casing for the gyroscope, a ring lying in the plane of rotation of the gyroscope and within which the casing is mounted upon an axis perpendicular to the spinning axis of the gyroscope, a second ring perpendicular to the first ring and within which the first ring is mounted about an axis coinciding with the axis on which the casing is mounted, said ring being uniform in section, and a third ring connected to and perpendicular to the first and second rings, said third ring being uniform in section and having a moment of inertia about any diameter approximately equal to the moment of inertia of the first ring and the casing about the spinning axis of the gyroscope.

6. In gyroscopic navigational apparatus, the combination of a gyroscope provided with trunnions, a gimbal sytsem on which the gyroscope is mounted by the trunnions, an element adapted to be displaced in accordance with the meridional component of the speed of the craft on which the apparatus is mounted, a member associated with one of the trunnions and movable axially thereof, connections between the element and the member whereby the member may be displaced in accordance with such components, a torque applying device associated with the gyroscope and a connection between the device and the member for altering the torque applied to the gyroscope by an adjustment of the member.

7. In gyroscopic navigational apparatus, the combination of a gyroscope, a liquid gravity control device for applying directive and damping torques to the gyroscope, a member adapted to be displaced in accordance with the meridional component of the speed of the craft on which the apparatus is mounted, means actuated by the member for annulling the torque about the horizontal axis of the gyroscope caused by the effect on the device of acceleration of the craft and means actuated by the member for applying a torque about the axis about which deviation of the gyroscope would occur due to the meridional component of the speed of the craft.

8. In gyroscopic navigational apparatus, the combination of a gyroscope, a liquid level torque applying device associated with the gyroscope, mechanism for applying torque to the gyroscope and means for adjusting the torques applied to the gyroscope by the device and the mechanism in accordance with meridional components of the speed of the craft on which the apparatus is mounted.

9. In gyroscopic navigational apparatus, the combination of a gyroscope, a following system on which the gyroscope is mounted, a support for the system, a liquid level torque applying device movably mounted on the gyroscope, mechanism for applying torque to the gyroscope, a member adapted to be displaced in accordance with the angular relation between the system and the support and in accordance with the speed of the craft and means actuated by the member for adjusting the torques applied to the gyroscope by the device and the mechanism in accordance with the changes in the angular relation and the speed.

10. In gyroscopic navigational apparatus, the combination of a gyroscope, a member within which the gyroscope is mounted on a horizontal trunnion axis perpendicular to the spinning axis of the gyroscope, a second member fixed to the first member and lying in the vertical plane through the rotor axis, a third member within which the second member is mounted for turning about a vertical axis, a binnacle and members connecting the third member to the binnacle.

11. In gyroscopic navigational apparatus, a sensitive element mounted for turning about a vertical axis and including a gyroscope and supporting members therefor, a liquid level torque applying device movably mounted on the gyroscope, means variably connecting the device to the supporting members whereby the point of connection therebetween may be displaced, mechanism for applying a torque to the sensitive element about its vertical axis, a part adjustable in accordance with the meridional component of the speed of the craft, means connecting the part to the connecting means for adjusting the device relatively to the sensitive element in accordance with the adjustment of the part and means connecting the part to the mechanism for varying the torque applied thereby in accordance with the adjustment of the part.

12. In gyroscopic navigational apparatus, a sensitive element mounted for turning about a vertical axis and including a gyroscope and supporting members therefor, a liquid level torque applying device movably mounted on the gyroscope, means variably connecting the device to the supporting members, a resilient connection between said means and the gyroscope, mechanism for applying a torque to the sensitive element about its vertical axis, a part adjustable in accordance with the meridional component of the speed of the craft, means connecting the part to the connecting means for adjusting the device and the resilient connection relatively to the sensitive element in accordance with the adjustment of the part and means connecting the part to the mechanism for varying the torque applied thereby in accordance with the adjustment of the part.

13. In gyroscopic navigational apparatus, the combination of a sensitive element including a gyroscope, a torque applying system movably mounted on the element, a member adjustable in accordance with the meridional component of the speed of the craft on which the apparatus is mounted, and means controlled by the member for changing the relation of the system to the element to prevent changes of bearing of the element with respect to the earth upon changes in course or speed of the craft.

14. In gyroscopic navigational apparatus, the combination of a sensitive element including a gyroscope, a follow-up element, a filar suspension for mounting the sensitive element on the follow-up element, a yielding connection between the sensitive element and the follow-up element, means for producing relative displacement between said elements to apply a torque to the gyroscope by twisting the filar suspension and means for displacing one of the points of attachment of the yielding connection to prevent the same from applying a torque to the sensitive element upon displacement between said element and the follow-up element.

15. In gyroscopic navigational apparatus, the combination of a sensitive element including a gyroscope, a follow-up element, means for mounting the sensitive element on the follow-up element including a torque applying member actuated by relative displacement between the elements, means for producing relative displacement between said elements to apply a torque to the gyroscope, a yielding connection between said elements and means for shifting one of the points of attachment of the connection to prevent the application of torques which would otherwise be produced by the displacement between said elements.

16. In gyroscopic navigational apparatus, the combination of a sensitive element including a gyroscope, a follow-up element, means for mounting the sensitive element on the follow-up element, means for producing relative displacement between said elements to apply a torque to the gyroscope, means for transmitting to a distance indications of the movement of the follow-up element and means actuated in accordance with the relative displacement between the elements and operable upon the transmitting means for correcting the transmitted indications in accordance with such relative displacement.

17. In gyroscopic navigational apparatus, the combination of a sensitive element including a gyroscope, a member on which the gyroscope is mounted by means of trunnions, a member located on a trunnion axis of the sensitive element and a yielding connection between the second named member and a point of the sensitive element eccentric to said axis.

18. In gyroscopic navigational apparatus, the combination of a sensitive element including a gyroscope, a supporting member on which the sensitive element is mounted by means of trunnion axes, an adjustable mechanism for applying torques to the sensitive element and having a part in alignment with one of the trunnion axes, a member mounted on the supporting member and adjustable in accordance with changes in course or speed of the craft on which the appraatus is mounted and means connecting the adjustable member and the part at a point situated on the trunnion axis of the sensitive element and adapted to move along said axis during the adjustment.

19. In gyroscopic navigational apparatus, the combination of a sensitive element including a gyroscope and a casing, a supporting element for the sensitive element, trunnions between said elements and means for applying torque to the sensitive element including a part located on the axis of one of said trunnions and adapted to move axially along said axis.

20. In gyroscopic navigational apparatus, the combination of a sensitive element including a gyroscope, a liquid level device for applying to the gyroscope directive and damping torques, there being a constriction in said level to retard flow of said fluid due to an acceleration of the craft sufficiently to prevent ballistic deflection of the gyroscope to the virtual meridian during said acceleration, a torque applying system movably mounted on the element, a member adjustable in accordance with the meridional component of the speed of the craft on which the apparatus is mounted, and means controlled by the member for changing the relation of the system to the element to prevent changes of bearing of the element with respect to the earth upon changes in course or speed of the craft.

21. In gyroscopic apparatus the combination of a gyroscopic sensitive element, a support on which the element is mounted by trunnions, an adjustable mechanism on said sensitive element and means to actuate said adjustment from outside said element while reducing to a minimum reaction torques on the element due to the adjustment, said means comprising a movable member mounted on the element having a part situated in line with said trunnions and moving in a plane containing said trunnions, a connection between said member and said mechanism, and adjustable means associated with the support and having a part movable along the axis of said trunnions, said second part having point contact with first said part on said axis.

22. In gyroscopic navigational apparatus, a gyroscopic sensitive element supported in a swinging support, said element comprising a gyroscope having a substantially horizontal spinning axis, a casing for said gyroscope having a horizontal trunnion axis at right angles to said spinning axis and a gimbal frame supporting said trunnion axis and having a normally vertical trunnion axis pivoted in said swinging support, said frame comprising a plurality of interconnected rings including a ring substantially inclined to said horizontal trunnion axis, the masses of said frame and casing being distributed so that the moments of inertia about said spinning axis of all their parts having swinging movement about said axis are equal to the moment about said horizontal trunnion axis of all parts having swinging movement about said trunnion axis whereby dynamical symmetry of said sensitive element about said vertical axis is effected.

23. In gyroscopic navigational apparatus the combination of a gyroscope, a liquid level gravity control device for applying directive and damping torques to the gyroscope, there being a constriction in said device to retard the rate of flow of fluid produced by an acceleration of the craft on which the apparatus is mounted sufficiently to make said rate proportional to the change in the meridional component of the speed of the craft, a torque applying mechanism for applying torques to the gyroscope, a member displaceable in proportion to the meridional component of the speed of the craft, and means actuated by the member for adjusting the position of the device and the mechanism in relation to the gyroscope in proportion to movements of the member.

JAMES BLACKLOCK HENDERSON.